United States Patent
Hoshino

(10) Patent No.: US 6,308,488 B1
(45) Date of Patent: Oct. 30, 2001

(54) TRIM ASSEMBLY FOR VEHICLE

(75) Inventor: Yoshihiro Hoshino, Shioya-gun (JP)

(73) Assignee: TS Tech Co., Ltd., Asaka (JP)

( * ) Notice: Subject to any disclaimer, the term of this patent is extended or adjusted under 35 U.S.C. 154(b) by 0 days.

(21) Appl. No.: 09/332,168

(22) Filed: Jun. 14, 1999

(30) Foreign Application Priority Data

Oct. 14, 1998 (JP) .................................................. 10-292390

(51) Int. Cl.$^7$ .................................................. E04C 2/38
(52) U.S. Cl. .................. 52/716.5; 52/511; 52/716.6; 52/718.01; 296/146.7; 296/39.1; 428/31; 428/99; 428/100
(58) Field of Search .................................................. 52/511, 716.5, 52/716.6, 718.01; 296/146.7, 39.1; 428/31, 99, 100

(56) References Cited

U.S. PATENT DOCUMENTS

| | | | |
|---|---|---|---|
| 1,740,431 | * 12/1929 | Walters | 52/511 |
| 1,760,259 | * 5/1930 | Walters | 52/511 |
| 1,760,260 | * 5/1930 | Walters | 52/511 |
| 2,379,595 | * 7/1945 | Roe | 52/511 |
| 3,620,277 | * 11/1971 | Tummarello | 52/511 |
| 5,202,172 | * 4/1993 | Graf | 428/31 |
| 5,288,530 | * 2/1994 | Maki | 428/31 |
| 5,552,202 | * 9/1996 | May | 428/43 |
| 5,616,396 | * 4/1997 | Ueki | 428/139 |
| 5,639,522 | * 6/1997 | Maki | 52/716 |
| 5,897,936 | * 4/1999 | Havens | 428/57 |
| 6,085,483 | * 7/2000 | Kurosaki | 52/716.5 |

\* cited by examiner

Primary Examiner—Carl D. Friedman
Assistant Examiner—Dennis L. Dorsey
(74) Attorney, Agent, or Firm—Oliff & Berridge, PLC

(57) ABSTRACT

A mounting structure formed on a plate-like member and for mounting the plate-like member to a trim panel for a vehicle, the mounting structure comprises an approximately T-like shape in cross section. A trim assembly for a vehicle comprises: a plate-like member; a cushion member disposed on the plate-like member; and a top cover covering the whole cushion member, wherein peripheral portions of which are secured to peripheral portions of the plate-like member; wherein a mounting structure comprising an approximately T-like shape in cross section, for mounting the trim assembly to a trim panel for a vehicle is formed on the plate-like member.

2 Claims, 9 Drawing Sheets

TRIM ASSEMBLY FOR VEHICLE

BACKGROUND OF THE INVENTION

1. Field of the Invention

The present invention relates to a trim assembly for a vehicle, in particular, a mounting structure of a plate-like member for mounting the plate-like member to a trim panel for a vehicle and a trim assembly using the same.

2. Description of Related Art

In a door lining or trim panel for a vehicle, a trim assembly (pad) having a decorative top cover to improve luxurious feeling for aesthetic appearance is known.

For example, an earlier door lining assembly (pad) or a trim panel assembly (pad) for a trim panel for a vehicle is attached above an armrest portion of the trim panel. Thereby, the trim panel has a good aesthetic appearance with the decorative top cover. A portion of the trim panel has a plane recess for the trim panel assembly to be attached. A side of the trim panel assembly has a plane shape to be attached to the trim panel. The trim panel assembly is mounted to be secured to the trim panel by a screw or the like with the plane portions of the trim panel and the trim panel assembly facing each other.

A trim panel assembly having claws on a side to be attached to a trim panel, which are inserted into attaching holes of the trim panel and then bent for securing the trim panel assembly, is known.

However, the above-described earlier trim panel assemblies have problems as follows when the trim panel assemblies are attached to the trim panel.

In a case of the former, the trim panel assembly and the portion of the trim panel have the same plane shapes as each other, so that the trim panel assembly easily moves relative to the trim panel. Accordingly, when the trim panel assembly is attached to be secured to the trim panel, the trim panel assembly slightly moves from an accurate position on the trim panel assembly, thereby requiring a lot of time for positioning and attaching the trim assembly.

In a case of the latter, the works for bending the claws and securing the trim panel assembly are troublesome and require a lot of time; or speciallized equipment is required for bending claws.

SUMMARY OF THE INVENTION

The present invention was developed in view of the above-described problems. Therefore, an object of the present invention is to provide a mounting structure of a plate-like member, for mounting the plate-like member to a trim panel for a vehicle, and for enabling the plate-like member to be mounted to the trim panel in a short time, to be accurate positioned and to be easily secured thereto. Another object of the present invention is to provide a trim assembly using the above-described mounting structure. A further object of the present invention is to provide a trim assembly which requires no specialized equipment for bending claws.

In order to accomplish the above-described object, in one aspect of the present invention, a mounting structure formed on a plate-like member and for mounting the plate-like member to a trim panel for a vehicle comprises an approximately T-like shape in cross section.

For the trim panel, a door lining or a trim panel for a door of a vehicle is generally applied; however, for example, a side lining for a body side molding, or the like can be also applied.

For the plate-like member, polypropylene is generally applied; however, another hard resin can be also applied.

According to the mounting structure of the invention, the mounting structure is formed on the plate-like member, for mounting the plate-like member to a trim panel for a vehicle, and comprises an approximately T-like shape in cross section. On the other hand, a hole portion having a shape to fit to the T-like shape is formed in the trim panel. The plate-like member is mounted to the trim panel for a vehicle through the mounting structure, thereby it is possible to speedily mount the plate-like member to the trim panel. Further, through the mounting structure, it is possible for anyone to easily perform a positioning of the plate-like member and to certainly secure the plate-like member to the trim panel for a vehicle. The mounting structure has the T-like shape in cross section, so that the mounting structure has high strength and is not deformed. Accordingly, it is possible to prevent the occurrence of looseness or a rattle of the plate-like member during the vehicle operation. Further, the plate-like member and the mounting structure formed in the plate-like member are made of resin, so that it is possible to prevent scratches by the mounting structure against a member of the vehicle, such as the trim panel to which the plate-like member is mounted. Further, the mounting structure and the plate-like member made of resin are lighter than the those made of iron plate, so that it is possible to improve safety of work. Further, it is possible to require no specialized equipment for bending claws. Further, it is possible to easily disassemble the member of the vehicle and the plate-like member, thereby improving recyclability thereof.

The mounting structure of the plate-like member can further comprise two bar-like guide members. Top faces of the bar-like guide members and a lower surface of a head portion of the T-like shape of the mounting structure can be approximately parallel to each other.

According to the mounting structure, the mounting structure can have two bar-like guide members, so that it is possible for anyone to more easily carry out the positioning of the plate-like member to the trim panel for a vehicle through the mounting structures and to more certainly secure the plate-like member to the trim panel for a vehicle. Further, a space may not result between the plate-like member and the member of the vehicle, to which the plate-like member is mounted, so that it is possible to prevent the occurrence of looseness or a rattle of the plate-like member during the vehicle operation.

In accordance with another aspect of the invention, a trim assembly for a vehicle comprises: a plate-like member; a cushion member disposed on the plate-like member; and a top cover covering the whole cushion member, wherein peripheral portions of the cover are secured to peripheral portions of the plate-like member; wherein a mounting structure comprising an approximately T-like shape in cross section, for mounting the trim assembly to a trim panel for a vehicle, is formed on the plate-like member. The mounting structure can further comprise two bar-like guide members.

The trim assembly is used for a door lining assembly (pad) or a trim panel assembly (pad) for a door panel of a vehicle. However, it is not limited to this, for example, the trim assembly can also be used for a side lining assembly (pad) for a body side molding, or the like.

For the top cover, cloth is generally applied; however, artificial leather, natural leather or the like can also be applied.

For the cushion member, foamed resin, such as polyurethane foam or the like can be applied; however, another material having cushioning properties can also be used for the cushion member.

According to the trim assembly for a vehicle, the trim assembly comprises a plate-like member, a cushion member disposed on the plate-like member, and a top cover covering the whole cushion member, wherein peripheral portions of the top cover are secured to peripheral portions of the plate-like member; wherein a mounting structure comprising an approximately T-like shape in cross section and two bar-like guide members is formed on the plate-like member. Accordingly, the trim assembly is mounted to the trim panel through the mounting structure, so that it is possible for anyone to easily carry out the positioning of the trim assembly to the member of the vehicle through the mounting structure and to more certainly secure the trim assembly to the trim panel for a vehicle. Further, it is possible to require no specialized equipment for bending claws.

The plate-like member can have an approximately plane shape or a curved shape on a side to which the mounting structure is formed. Top faces of the bar-like guide members and a lower surface of a head portion of the T-like shape of the mounting structure can be approximately parallel to each other.

According to the trim assembly, because the top faces of the bar-like guide members and the lower surface of the head portion of the T-like shape of the mounting structure can be approximately parallel to each other, it is possible to easily perform accurate positioning of the trim assembly to the member of the vehicle through the mounting structure and to more certainly secure the trim assembly to the member of the vehicle. This is so whether the plate-like member has a plane shape or a curved shape on a side to which the mounting structure is formed

BRIEF DESCRIPTION OF THE DRAWINGS

The above and other objects, features and advantages of the invention will become more apparent from the following description taken in conjunction with the accompanying drawings wherein like references refer to like parts and wherein:

FIGS. 4A and 4B show the hook having the T-like shape in cross section, as shown in FIG. 2 mounted in the slide hole portion, as shown in FIG. 3; wherein FIG. 4A is an enlarged perspective view thereof; and FIG. 4B is a cross-sectional view taken along the line A–A' of FIG. 4A looking in the direction of the arrows;

PREFERRED EMBODIMENT OF THE INVENTION

The embodiments of the mounting structure of a plate-like member, for mounting the plate-like member to a trim panel for a vehicle and the trim assembly FOR a vehicle using the same, in accordance with the present invention will be explained with reference to FIGS. 1 to 9.

Figure 1:
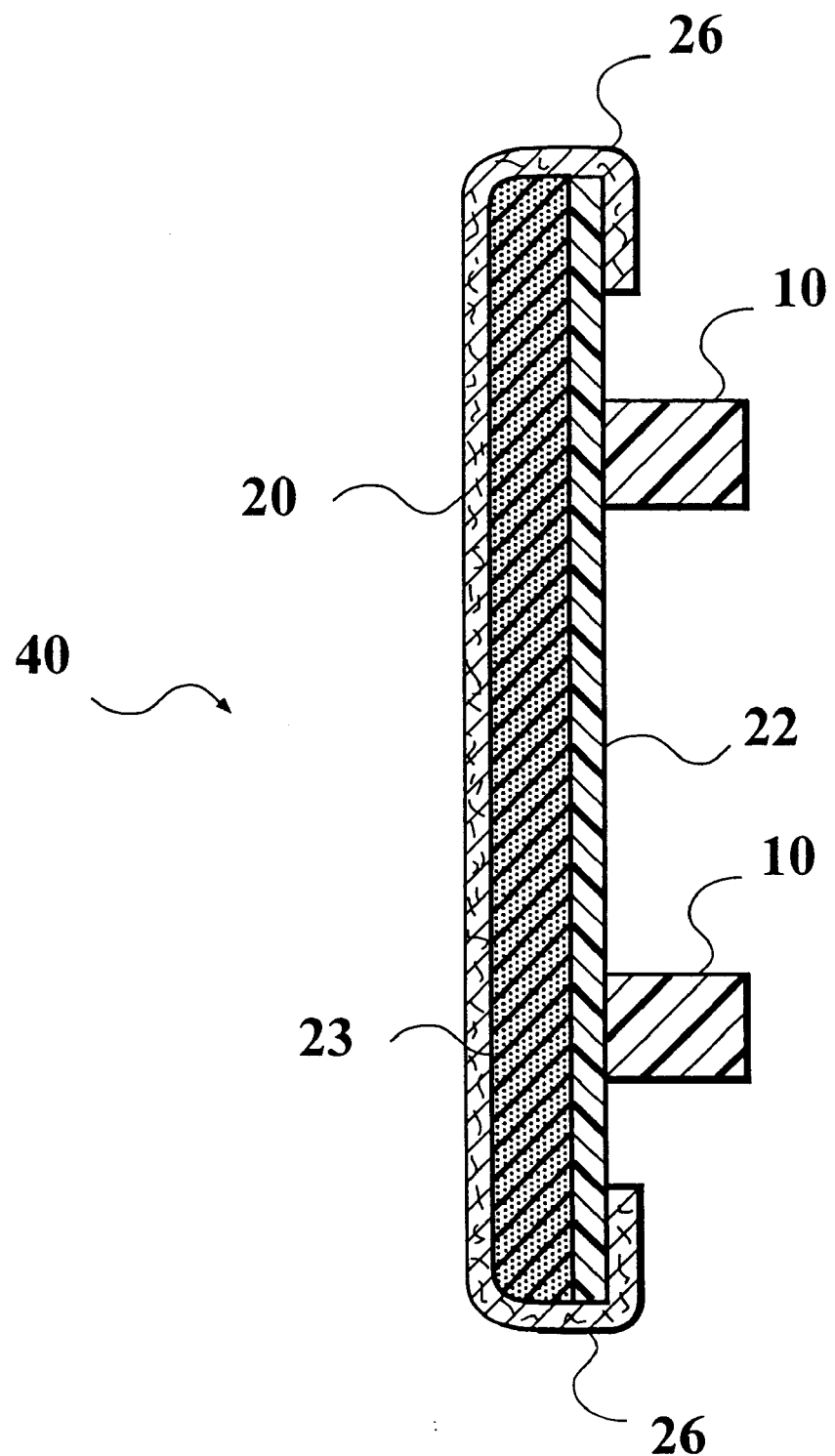
FIG. 1 is a vertical cross-sectional view showing a trim assembly only according to the first embodiment of the present invention.
Figure 2:
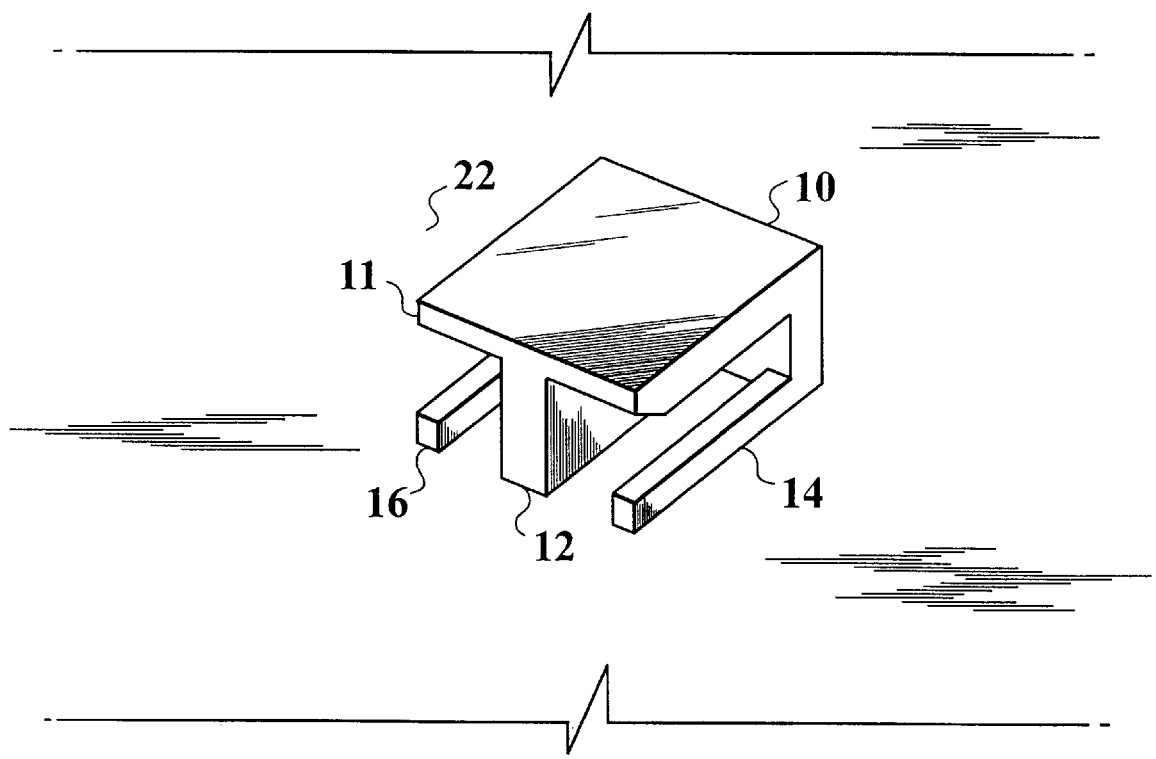
FIG. 2 is an enlarged perspective view of a hook shown in FIG. 1 which has a T-like shape in cross section and is formed on a back surface of a plate-like base.

At first, the mounting structure of a plate-like member, for mounting the plate-like member to a trim panel for a vehicle and the trim assembly for a vehicle using the same, in accordance with the first embodiment of the present invention will be explained with reference to FIGS. 1 to 7. FIG. 1 is a vertical cross-sectional view showing a door lining assembly (pad) or a trim panel assembly (pad) as a trim assembly according to the first embodiment of the present invention; and FIG. 2 is an enlarged detailed view of a hook having a T-like shape in cross section, as a mounting structure of a plate-like member, for mounting the plate-like member to a trim panel for a vehicle, according to the first embodiment of the invention.

The trim assembly for a vehicle, according to the embodiment, comprises a top cover 20, a plate-like base 22 as a plate-like member, and a cushion member 23 stuck on the plate-like base 22.

The top cover 20 is a decorative member made of cloth, natural leather, artificial leather or the like. The periphery of the top cover 20 comprises a front peripheral portion, upper and lower peripheral portions which extend from upper and lower ends of the front peripheral portion toward rear sides in upper and lower sides, respectively, and a rear peripheral portion which connects rear ends of the upper and lower peripheral portions. The front and rear peripheral portions, and the upper and lower peripheral portions are approximately parallel to each other, respectively, so that the top cover 20 has a quadrilateral shape. That is, the periphery of the top cover 20 has a shape of an approximately parallelogram.

The plate-like base 22 is made of, for example, hard resin, such as polypropylene. The periphery of the plate-like base 22 comprises, as described above with respect to the top cover 20, a front peripheral portion, upper and lower peripheral portions which extend from upper and lower ends of the front peripheral portion toward rear sides in upper and lower sides, respectively, and a rear peripheral portion which connects rear ends of the upper and lower peripheral portions. The front and rear peripheral portions, and the upper and lower peripheral portions are approximately parallel to each other, respectively, so that the plate-like base 22 also has a shape of an approximately parallelogram.

On a back surface of the plate-like base 22, a plurality of hooks 10, as shown in FIG. 2, are formed as a body. The hooks 10 have leg portions 12 and head portions 11 which have shapes of rectangular parallelepiped. The plural hooks 10 have T-like shapes in cross sections, when looking from front or rear sides of the plate-like base 22 when a side to be attached to the vehicle, of the plate-like base 22, i.e., the back surface faces upward to be in a horizontal state. The head portion 11 has a rectangular shape looking from above and is approximately parallel to the plate-like base 22. The leg portion 12 is approximately perpendicular to the plate-like base 22 and the head portion 11. The plural hooks 10 comprise two bar-like guides 14 and 16 at right and left sides of the leg portion 12, respectively. The head portion 11, the leg portion 12 and the guides 14 and 16 are connected at one ends at which a wall like portion is formed. The wall like portion is perpendicular to the head portion 11. The bar-like guides 14 and 16 have shapes of rectangular parallelepiped and are approximately parallel to the leg portion 12 of the T-like shape. Each of the leg portion 12 and the bar-like guides 14 and 16 has surfaces which are approximately perpendicular to the plate-like base 22.

The cushion member 23 is joined to the plate-like base 22 by bonding or the like. The cushion member 23 is made of, for example, polyurethane foam which has a thickness of about 8 millimeters. The cushion member 23 stuck on the surface of the plate-like base 22 has a shape which is suitable to be inserted into the inside of a space which is made by the top cover 20 and the plate-like base 22, which have the shapes of approximately parallelograms.

The top cover 20 is disposed on the cushion member 23 to cover the whole cushion member 23 stuck on the surface of the plate-like base 22. The upper peripheral portion of the top cover 20 is turned back to a side of the plate-like base 22, on which the hooks 10 are formed, so as to wrap the upper peripheral portion of the plate-like base 22, and then secured by bonding or stapling. Reference numeral 26 denotes turned back portions of the top cover 20. Similarly, the front peripheral portion, the lower peripheral portion and the rear peripheral portion, of the top cover 20 are turned back so as to wrap the front peripheral portion, the lower peripheral portion and the rear peripheral portion, respectively, of the plate-like base 22, and then secured by bonding or stapling. As a result, a door lining assembly (pad) or a trim panel assembly (pad) 40 as the trim assembly can be manufactured.

The trim panel assembly 40 is attached to a trim panel base 60 for a door, as shown in FIGS. 4A to 7.

Figure 3:
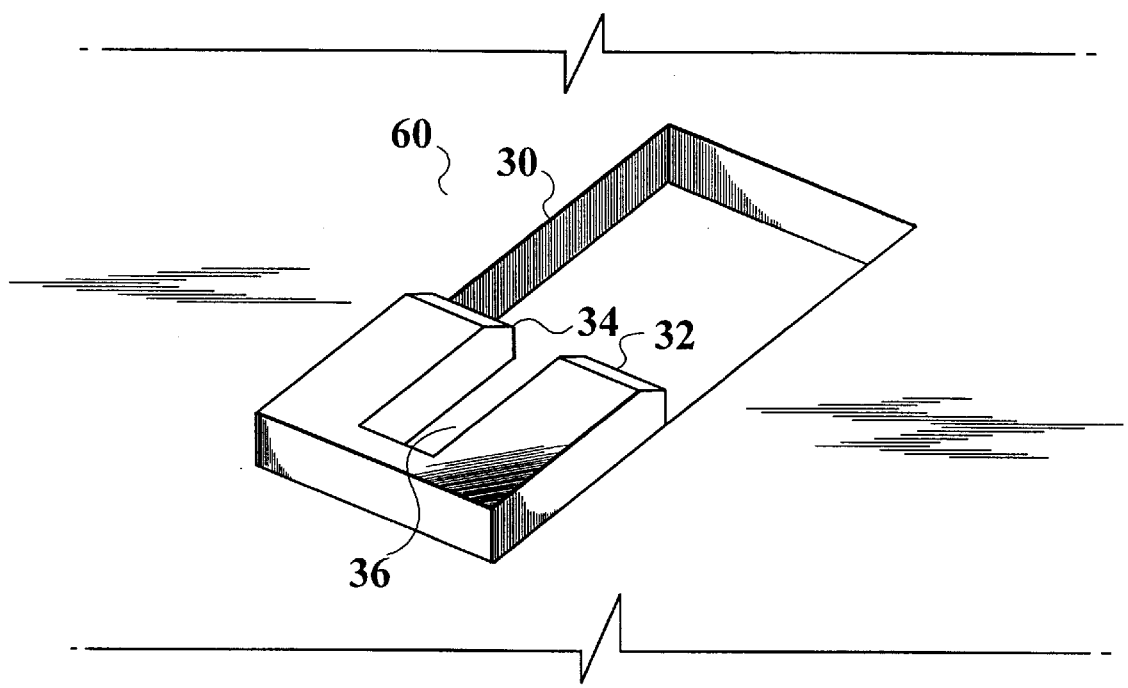
FIG. 3 is an enlarged perspective view showing a slide hole on formed in a trim panel base.

The trim panel base 60 comprises an armrest portion 62. An assembly attachment recess portion 63 is formed along an upper side of the armrest portion 62. An inner shield or a weather strip 64 is provided to the trim panel base 60 along an upper peripheral portion of the trim panel base 60. The assembly attachment recess portion 63 has a plane shape. In the assembly attachment recess portion 63, a plurality of slide hole portions 30 are formed for the hooks 10 to be attached therein. FIG. 3 is an enlarged perspective view showing the slide hole portion 30 of the trim panel base 60. As shown in FIG. 3, each of the plural slide hole portions 30 has two projecting portions 32 and 34. A recess portion 36 between the two projecting portions 32 and 34 has a shape to fit to the leg portion 12 of the T-like shape of the hook 10 having the T-like shape in cross section. That is, side surfaces of the projecting portions 32 and 34 which sandwich the leg portion 12 of the hook 10 having the T-like shape in cross section are approximately perpendicular to the trim panel base 60. The projecting portions 32 and 34 have a shape to fit between the head portion 11 and the guides 14 and 16. In other words, the head portion 11, top faces of the two bar-like guides 14 and 16, and surfaces of the projecting portions 32 and 34 of the slide hole portions 30 are approximately parallel to the trim panel base 60. That is, the head portion 11, the top faces of the guides 14 and 16 and the projecting portions 32 and 34 are parallel to each other.

The trim panel assembly 40 is fitted to the assembly attachment recess portion 63 of the trim panel base 60, so that the hooks 10 which project to a body side, i.e., the back surface of the trim panel assembly 40, are projected to the body side of the trim panel base 60 through the slide hole portions 30 formed in the assembly attachment recess portion 63.

Figure 4A:
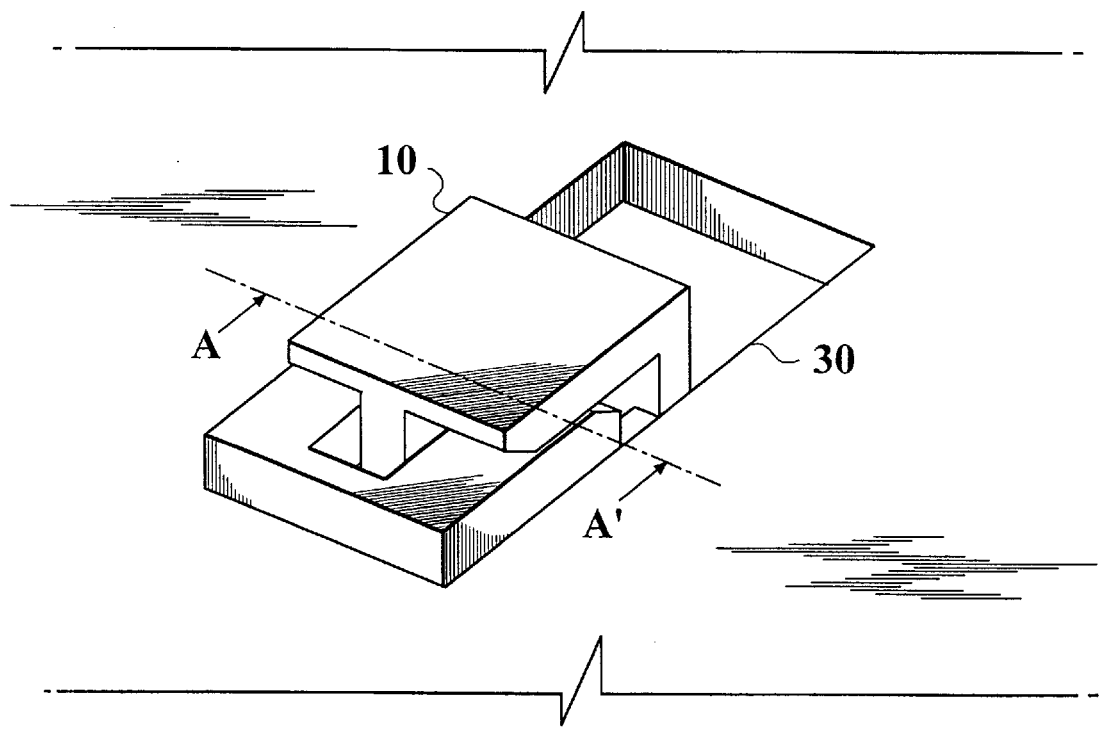
Figure 4B:
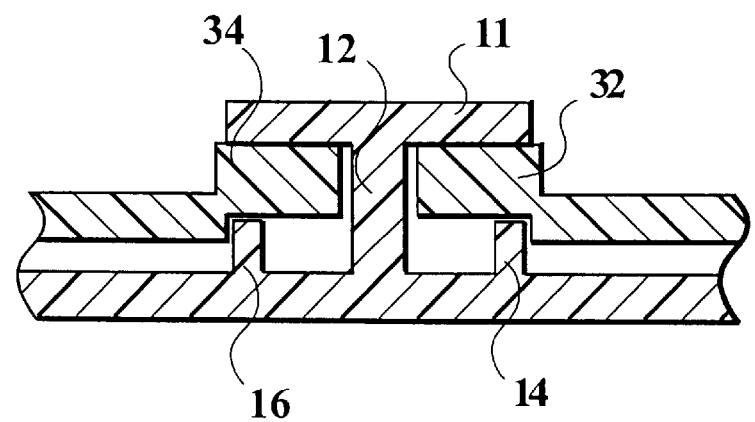
Figure 5:
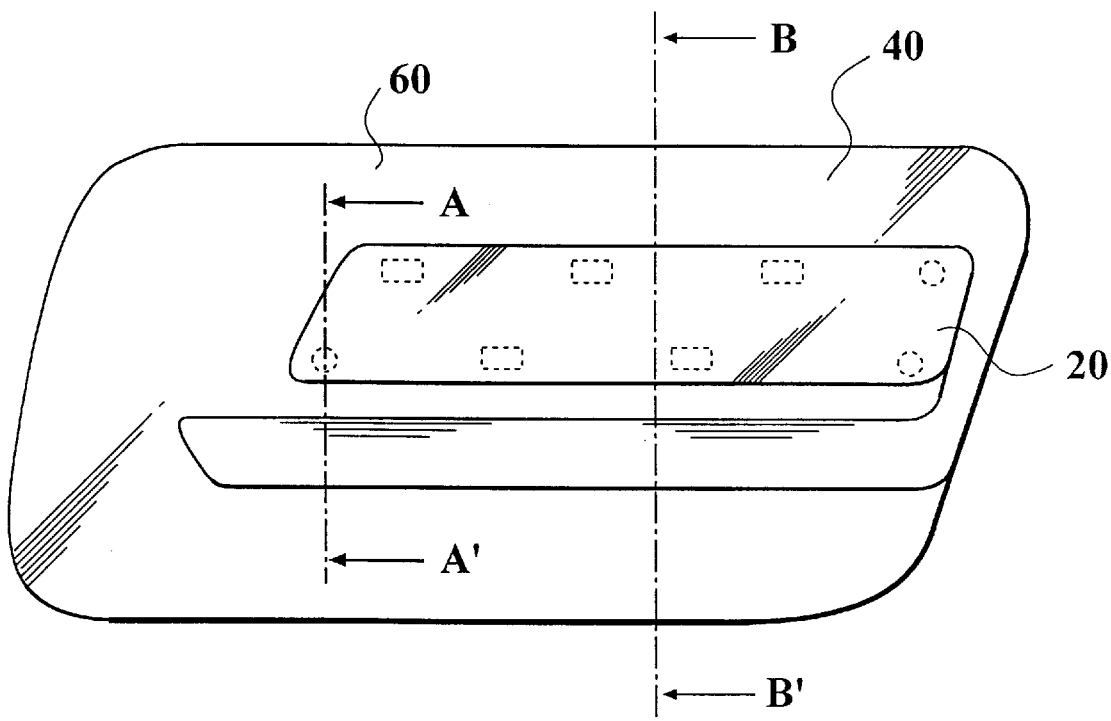
FIG. 5 is a schematic front view showing the trim assembly o f FIG. 1 mounted to the trim panel base.
Figure 6:
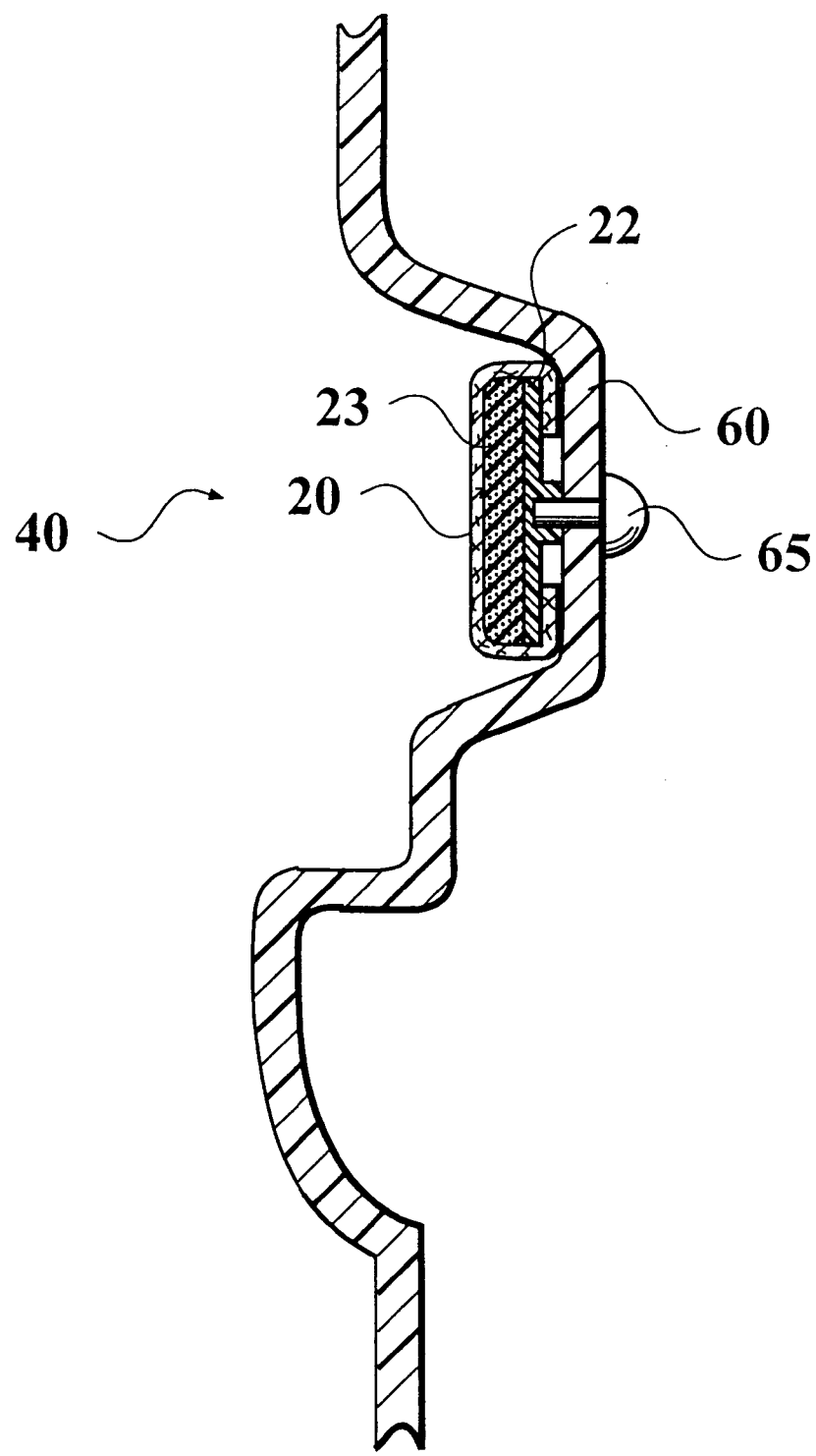
FIG. 6 is a cross-sectional view taken along the line A–A' of FIG. 5 looking in the direction of the arrows.
Figure 7:
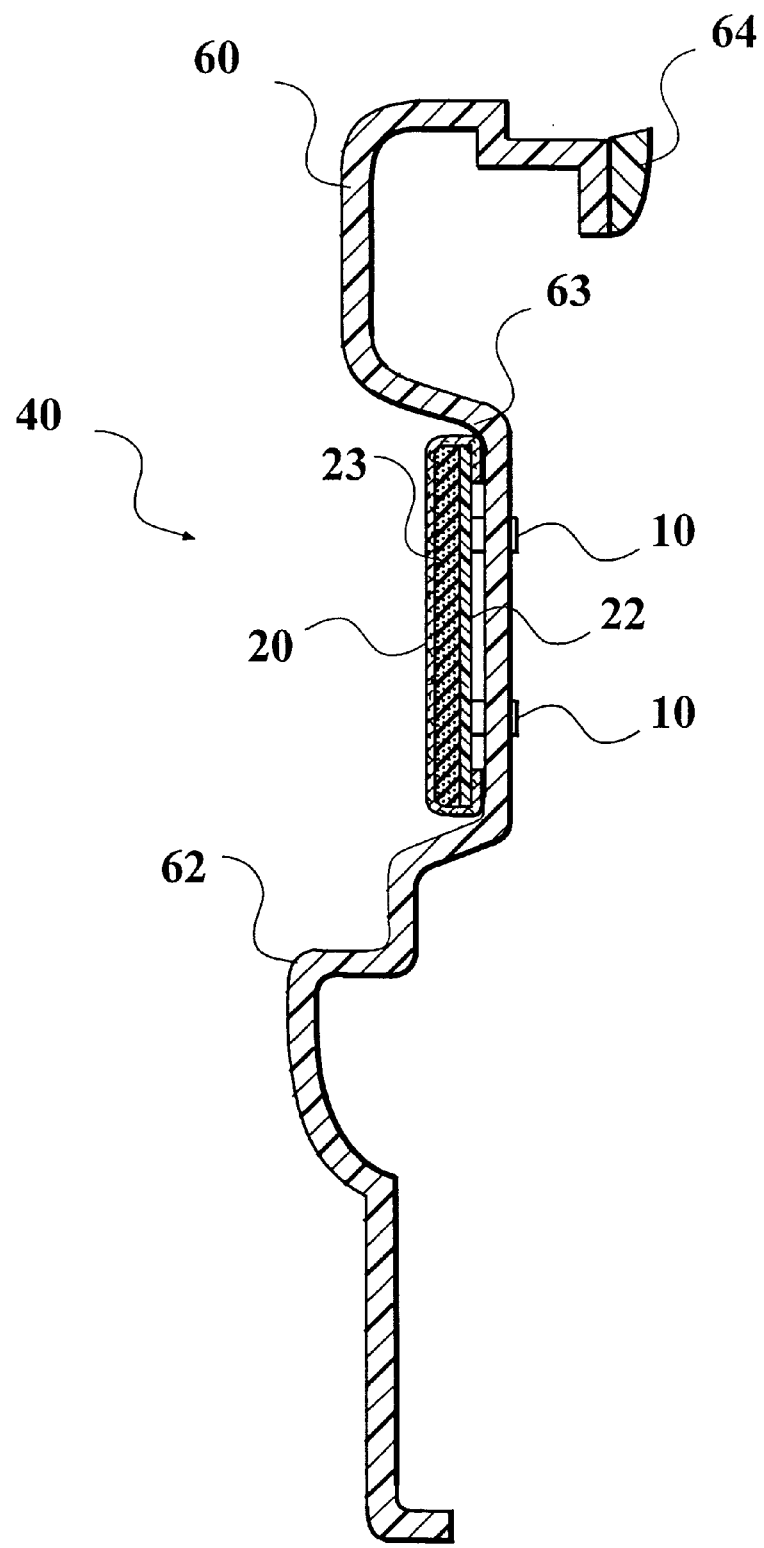
FIG. 7 is a cross-sectional view taken along the line B–B' of FIG. 5 looking in the direction of the arrows.

Then, the trim panel assembly 40 is slid in the front or rear directions, so that the leg portions 12 of the T-like shapes of the hooks 10 and the recess portions 36 of the slide hole portions 30 are fitted to each other, as shown in FIGS. 4A and 4B. The two bar-like guides 14 and 16 and the head portions 11 of the hooks 10 having the T-like shapes in cross sections sandwich the projecting portions 32 and 34 of the slide hole portions 30. That is, because the head portions 11 of the T-like shapes, the top faces of the guides 14 and 16 of the hooks 10 and the projecting portions 32 and 34 are parallel to each other, the trim panel assembly 40 is mounted to the trim panel base 60 without loosening. The trim panel assembly 40 mounted thereto as above-described is, as shown in FIG. 6, secured to the trim panel base 60 by that a screw 65 is penetrated into the plate-like base 22 from a side of the trim panel base 60.

As described above, according to the trim panel assembly 40 in the first embodiment of the invention, particularly, the plate-like base 22 has the plural hooks 10 as mounting structures having the approximately T-like shapes in cross sections and is mounted to the trim panel base 60 so that the leg portions 12 of the T-like shapes of the hooks 10 may fit to the recess portions 36 between the two projecting portions 32 and 34 of the plural slide hole portions 30 formed in the trim panel base 60 for a vehicle. Thereby it is possible to easily and speedily mount the trim panel assembly 40 to the trim panel base 60. Even if the attachment portions facing to each other have plane shapes, it is possible to easily perform a certain positioning of the trim panel assembly 40. Further, the hooks 10 have two bar-like guides 14 and 16, so that it is possible to more easily carry out the positioning of the trim panel assembly 40 to the trim panel base 60 by using the hooks 10 as the mounting structures and to obtain an advantage that the plate-like base 22 is more certainly secured to the trim panel base 60 for the vehicle. Further, a space does not occur between the plate-like base 22 and the trim panel base 60, so that it is possible to prevent occurrence of looseness or a rattle of the trim panel assembly 40 during the vehicle runs. The hooks 10 having the T-like shapes in cross sections have leg portions 12 of the T-like shapes, so that the hooks 10 have high strength to not be deformed. Accordingly, it is possible to prevent the occurrence of looseness or a rattle of the trim panel assembly 40 during the vehicle operation. Further, the plate-like base 22 and the hooks 10 having the T-like shapes in cross sections, formed in the plate-like base 22 are made of resin, so that the plate-like base 22 is lighter than one made of iron plate; and it is possible to prevent scratches in the trim panel base 60 by the hooks 10 and to improve safety of work. Further, it is possible to require no specialized equipment for bending claws. Further, it is possible to easily disassemble the trim panel base 60 and the plate-like base 22, thereby improving recyclability of the trim panel assembly 40.

Figure 8:
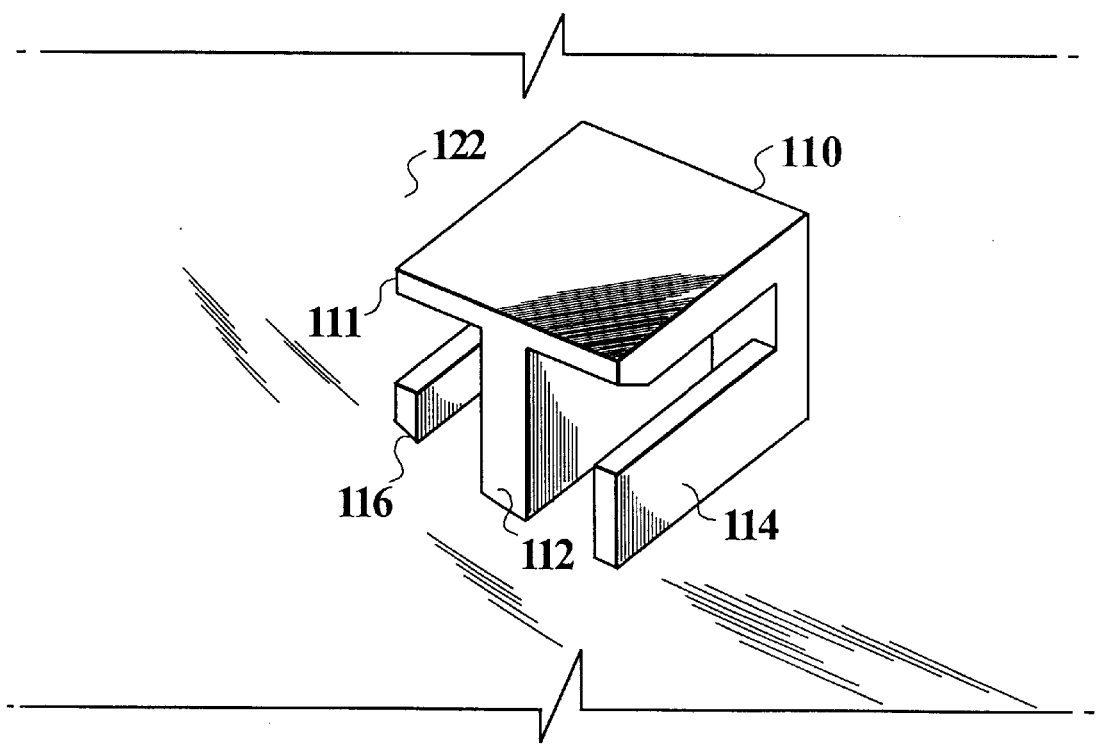
FIG. 8 is an enlarged perspective view of a hook which has a T-like shape in cross section and is formed on a back surface of a curved plate-like base, according to the second embodiment of the invention.
Figure 9:
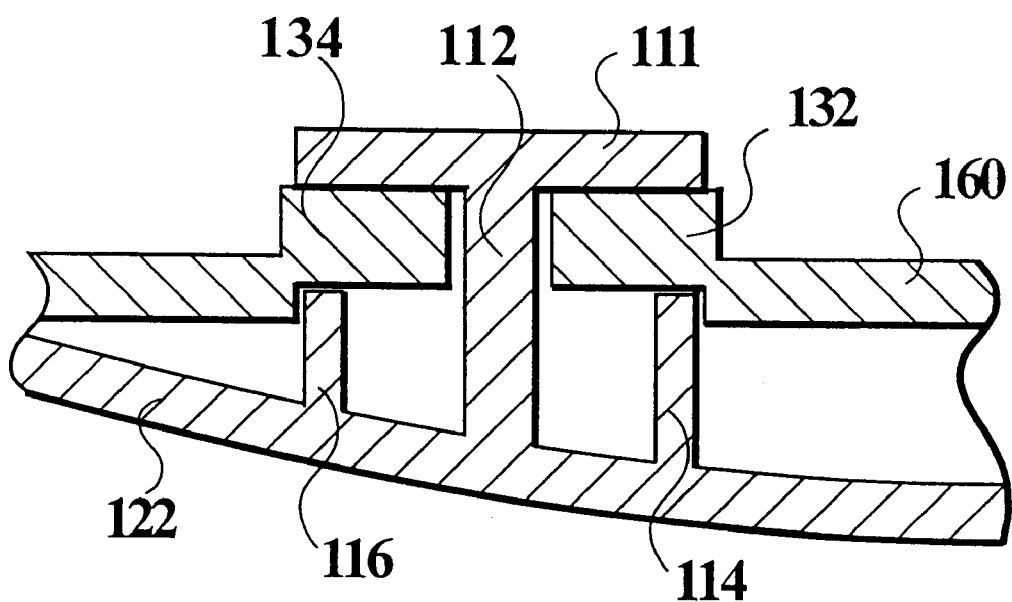
FIG. 9 is a cross-sectional view showing the hook having the T-like shape in cross section, as shown in FIG. 8, mounted in the slide hole portion of the trim panel base.

Next, a mounting structure of a plate-like member, for mounting the plate-like member to a trim panel for a vehicle and the trim assembly for a vehicle using the same, in accordance with the second embodiment of the present invention will be explained with reference to FIGS. 8 and 9. FIG. 8 is an enlarged perspective view of a hook having a T-like shape in cross section, formed in a back surface of a curved plate-like member according to the second embodiment of the invention. FIG. 9 is a cross-sectional view showing the hook having a T-like shape in cross section, as shown in FIG. 8, mounted to a slide hole portion of a trim panel base.

The trim assembly for a vehicle, according to the embodiment, comprises a top cover, a plate-like base 122 as a plate-like member, and a cushion member stuck on the plate-like base 122.

The top cover is made of cloth, natural leather, artificial leather or the like. The periphery of the top cover comprises the same shape as that of the first embodiment.

The plate-like base 122 is made of, for example, hard resin, such as polypropylene. The periphery of the plate-like base 122 comprises the same shape as that of the first embodiment. The plate-like base 122 is curved to project to a side of the top cover.

On a back surface of the plate-like base 122, a plurality of hooks 110, as shown in FIG. 8, are formed as a body. The plural hooks 110 have the T-like shapes in cross sections, when looking from front or rear sides of the plate-like base 122 when a side to be attached to the vehicle, of the plate-like base 122, i.e., the back surface faces upward to be in a horizontal state. The cross sections with T-like shapes have leg portions 112 and head portions 111 of the T-like shapes. The plural hooks 110 comprise two bar-like guides 114 and 116 at right and left sides thereof, respectively. The bar-like guides 114 and 116 have shapes of rectangular parallelepiped and are approximately parallel to the leg portions 112 of the T-like shapes. Each of the leg portions 112 of the T-like shapes and the bar-like guides 114 and 116 has surfaces which are approximately parallel and facing to each other. Top faces of the bar-like guides 114 and 116 are parallel to lower surfaces of the head portions 111 of the T-like shapes. The plate-like base 122 is curved, so that heights of the bar-like guides 114 and 116 are, as shown in FIG. 8, different from each other.

The cushion member is, as the first embodiment, joined to the plate-like base 122 by bonding or the like. The cushion member is made of, for example, polyurethane foam which has a thickness of about 8 millimeters. The cushion member stuck on the surface of the plate-like base 122 has a shape which is suitable to be inserted into an inside of a space which is made by the top cover and the curved plate-like base 122, which have the shapes of approximately parallelograms.

The upper peripheral portion, the front peripheral portion, the lower peripheral portion and the rear peripheral portion, of the top cover are, as the first embodiment, turned back to a side of the plate-like base 122, on which the hooks 110 are formed, so as to wrap the upper peripheral portion, the front peripheral portion, the lower peripheral portion and the rear peripheral portion, respectively, of the plate-like base 122 on which the cushion member is stuck, and then secured by bonding or stapling. As a result, a door lining assembly (pad) or a trim panel assembly (pad) as the trim assembly can be manufactured.

The trim panel assembly is attached to a trim panel base 160 for a door, as the first embodiment.

The trim panel base 160 comprises, as the first embodiment, an armrest portion. An assembly attachment recess portion is formed along an upper side of the armrest portion. The assembly attachment recess portion has a plane shape. In the assembly attachment recess portion, a plurality of slide hole portions for the hooks 110 to be attached therein are formed. As the first embodiment, each of the plural slide hole portions has two projecting portions 132 and 134 and the same shapes as that of the first embodiment.

The trim panel assembly is fitted to the assembly attachment recess portion of the trim panel base 160 and mounted to the trim panel base 160, as the first embodiment. The two bar-like guides 114 and 116 and the head portions 111 of the hooks 110 having the T-like shapes in cross sections sandwich the projecting portions 132 and 134 of the slide hole portions. The lower surfaces of the head portions 111 of the T-like shapes, the top faces of the guides 114 and 116 of the hooks 110 and the projecting portions 132 and 134 are parallel to each other, so that the trim panel assembly is mounted to the trim panel base 160 without loosening. The trim panel assembly mounted thereto as above-described is, as the first embodiment, secured to the trim panel base 160 by that a screw is penetrated into the plate-like base 122 from a side of the trim panel base 160.

As described above, according to the trim panel assembly in the second embodiment of the invention, particularly, the curved plate-like base 122 has the plural hooks 110 having the T-like shapes in cross sections, the lower surfaces of the head portions 111 of the T-like shapes and the top faces of the bar-like guides 114 and 116 are parallel to each other, and the bar-like guides 114 and 116 have the heights which are different from each other, so that even if the curved plate-like base 122 is applied, it is possible to easily and speedily mount the trim panel assembly to the trim panel base 160 and to easily perform accurate positioning of the trim panel assembly. Further, the heights of the bar-like guides 114 and 116 are adjusted so that the lower surfaces of the head portions 111 of the T-like shapes and the top faces of the bar-like guides 114 and 116 may be parallel to each other according to a degree of the curve of the curved plate-like base 122. Accordingly, it is possible to apply various plate-like bases having curved shapes to the trim panel assemblies. Therefore, even if the plate-like base and the two projecting portions 132 and 134 of the slide hole portions are not parallel to each other, it is possible to certainly mount the trim panel assembly to the trim panel base. Further, the trim panel assembly is mounted to the trim panel base 160 so that the leg portions 112 of the T-like shapes of the hooks 110 may fit to the recess portions between the two projecting portions 132 and 134 of the plural slide hole portions formed in the trim panel base 160. Thereby it is possible to easily and speedily mount the trim panel assembly to the trim panel base 160. Further, it is possible to require no specialized equipment for bending claws.

In the above-described embodiments, the trim assembly is used for a door lining assembly (pad) or a trim panel assembly (pad) for a door panel of a vehicle. However, it is not limited to this, for example, the trim assembly also can be used for a side lining assembly (pad) for a body side molding, or the like.

For the cushion member, foamed resin, such as polyurethane foam or the like is applied; however, another material having cushioning properties can be also used for the cushion member.

The materials of the plate-like base are not also limited to that in the embodiments.

From the foregoing description, one skilled in the art can easily ascertain the essential characteristics of this invention, and without departing from the spirit and scope thereof, can make various changes and modifications of the invention to adapt it to various usage and conditions.

The entire disclosure of Japanese patent application No. 10-292390 filed on Oct. 14, 1998 including specification, claims, drawings and summary are incorporated herein by reference in its entirety.

What is claimed is:

1. A mounting structure of a plate-like member for mounting the plate-like member to a trim panel for a vehicle, the mounting structure comprising:

a leg extending from the plate-like member;

a head connected to the leg, the leg extending between the head and the plate-like member, the head and the leg forming a hook with an approximately T-like shape in cross section, and the hook engaging with a portion of the trim panel for a vehicle; and two bar-like guide members that extend from the plate-like member, one of the bar-like guide members extending from the plate-like member on a first side of the leg, the other of the bar-like guide members extending from the plate-like member on a second side of the leg opposite the first side;

wherein a height of one bar-like guide member as measured from the plate-like member is different from a height of the other bar-like guide member as measured from the plate-like member so that a top face of each bar-like guide member and a lower surface of the head of the mounting structure are approximately parallel to each other.

2. A trim assembly for a vehicle comprising:

a plate-like member having a mounting structure for mounting the plate-like member to a trim panel for a vehicle, the mounting structure comprising (a) a leg extending from the plate-like member and (b) a head connected to the leg, the leg extending between the hook and the plate-like member, wherein the head and the leg form a hook with an approximately T-like shape in cross section, and the hook engages with a portion of the trim panel for a vehicle and (c) two bar-like guide members that extend from the plate-like member, one of the bar-like guide members extending from the plate-like member on a first side of the leg, the other of the bar-like guide members extending from the plate-like member on a second side of the leg opposite the first side;

a cushion member disposed on the plate-like member; and a top cover covering the whole cushion member, wherein peripheral portions of the top cover are secured to peripheral portions of the plate-like member:

wherein the plate-like member has a curved surface, the mounting structure is disposed on the curved surface, a height of one bar-like guide member as measured from the plate-like member is different from a height of the other bar-like guide member as measured from the plate-like member so that a top face of each bar-like guide member and a lower surface of the head of the mounting structure are approximately parallel to each other.

* * * * *